(12) United States Patent
Wang

(10) Patent No.: US 11,012,895 B2
(45) Date of Patent: May 18, 2021

(54) SESSION MANAGEMENT METHOD AND APPARATUS

(71) Applicant: China Academy of Telecommunications Technology, Beijing (CN)

(72) Inventor: Hucheng Wang, Beijing (CN)

(73) Assignee: China Academy of Telecommunications Technology, Beijing (CN)

(*) Notice: Subject to any disclaimer, the term of this patent is extended or adjusted under 35 U.S.C. 154(b) by 0 days.

(21) Appl. No.: 16/619,916

(22) PCT Filed: Jun. 6, 2018

(86) PCT No.: PCT/CN2018/090027
§ 371 (c)(1),
(2) Date: Dec. 5, 2019

(87) PCT Pub. No.: WO2018/223974
PCT Pub. Date: Dec. 13, 2018

(65) Prior Publication Data
US 2020/0383011 A1    Dec. 3, 2020

(30) Foreign Application Priority Data

Jun. 6, 2017 (CN) .......................... 201710418244.5
Aug. 9, 2017 (CN) .......................... 201710677595.8

(51) Int. Cl.
*H04W 36/00* (2009.01)

(52) U.S. Cl.
CPC ... *H04W 36/0022* (2013.01); *H04W 36/0044* (2013.01); *H04W 36/0066* (2013.01)

(58) Field of Classification Search
CPC ......... H04W 36/0022; H04W 36/0066; H04W 36/0044; H04W 76/10–12; H04W 76/15;
(Continued)

(56) References Cited

U.S. PATENT DOCUMENTS

2015/0003243 A1    1/2015  Klingenbrunn et al.
2019/0320476 A1*   10/2019 Wang ................ H04W 28/0268
(Continued)

FOREIGN PATENT DOCUMENTS

CN    101969634 A    2/2011
CN    102158871 A    8/2011
(Continued)

OTHER PUBLICATIONS

Catt: "TS 23.502: Handover procedure from 5GS to EPS for dual registration mode", 3GPP Draft; 52-173223_T5 23.502 Handover Procedure for Dual Registration Mode, 3rd Generation Partnership Project (3GPP), Mobile Competence Centre ; 650, Route Des Lucioles ; F-06921 Sophia-Antipolis vol. SA NGZ, No. Hangzhou, China; May 9, 2017, pp. 4.
(Continued)

*Primary Examiner* — Un C Cho
*Assistant Examiner* — Lalita W Pace
(74) *Attorney, Agent, or Firm* — Foley & Lardner LLP

(57) ABSTRACT

Disclosed are a session management method and apparatus, wherein same are applied to a mobile network. The method comprises: determining a registration mode of a terminal sending a session establishment request or an interoperation capability supported by a network side device; and when the registration mode is a single-registration mode or when the network side device supports the interoperation capability, determining the completion of the mapping of QoS parameters between different systems when a session connection is created for the terminal. The present invention solves the technical problems in the prior art that an SMF cannot determine whether QoS mapping needs to be performed when a terminal is establishing a session connection in a mobile network and that an unnecessary signalling process will be caused for a terminal with a dual-registration mode if the SMF always performs QoS mapping.

12 Claims, 4 Drawing Sheets

(58) Field of Classification Search
CPC ..... H04W 76/20; H04W 76/22; H04W 76/25; H04L 29/06176

See application file for complete search history.

(56) References Cited

U.S. PATENT DOCUMENTS

| | | | |
|---|---|---|---|
| 2020/0015294 A1* | 1/2020 | Xin | H04W 76/11 |
| 2020/0068445 A1* | 2/2020 | Wu | H04W 36/00 |
| 2020/0068449 A1* | 2/2020 | Jin | H04W 36/0016 |
| 2020/0077315 A1* | 3/2020 | Jin | H04W 36/00 |
| 2020/0084613 A1* | 3/2020 | Ying | H04W 36/02 |
| 2020/0084675 A1* | 3/2020 | Lu | H04W 48/16 |
| 2020/0092780 A1* | 3/2020 | Koshimizu | H04W 36/36 |

FOREIGN PATENT DOCUMENTS

| | | |
|---|---|---|
| CN | 104812096 A | 7/2015 |
| CN | 105636139 A | 6/2016 |
| JP | 2020-510345 A | 4/2020 |
| WO | WO-2011/162781 A1 | 12/2011 |
| WO | WO-2018/170696 A1 | 9/2018 |

OTHER PUBLICATIONS

Nokia, Alcatel-Lucent Shanghai Bell: "Pseudo-CR on Requirement for Interworking with E-UTRAN connected to EPO", SGPP Draft; C4?173025 BRD Generation Partnership Project (3GPP), Mobile Competence Centre ; 650, Route Des Lucioles ; F-06921 Sophia-Antipolis Cedex ; France, vol. CT WG4, No. Zhangiajie, PR. China; May 15, 2017, pp. 3.

NTT Docomo: "TS 23.502: Claritications to NGS to EPS Handover flow", 3GPP Draft; S2-172243 23502 56 to 4G HOV4, BRD Generation Partnership Project (BGPP),Mobile Competence Centre ; 650, Route Des Lucioles ; F-06921 SOPHiA-Antipolis Cedex ; France, vol. SA WG2, No. Susan, South Korea; Mar. 26, 2017, pp. 5.

ZTE: "TS 28.501 P-CR to Discussion and proposal on the handover from 56 to 4G", 3GPP Draft; S2-172152_TS 23.501 P-CR to Discussion and Proposal on the Handover From SG to 46, 3rd Generation Partnership Project (SGPP), Mobile Competence Centre ; 650, Route Des Lucioles ; F-06921 Sophia Antipolis, France, vol. SA WG2, No. Busen, Korea; Mar. 26, 2017, pp. 3.

Catt, TS 23.501: Clarification on N26 hole and corresponding corrections, SA WG2 Meeting #122bis, S2-175894, Aug. 21-25, 2017, Sophia Antipolis, France.

NTT Docomo, Considerations about session parameters mapping from EPS to 5GS, SA WG2 Meeting #121, S2-173316, May 15-19, 2017, Hangzhou, China, URL: https://www.3gpp.org/ftp/tsg_sa/WG2_Arch/TSGS2_121_Hangzhou/Docs/S2-173316.zip>.

Samsung, Update of Solution 18.4 to support QoS mapping on Common IP Anchor, SA WG2 Meeting #118, S2-166455; Nov. 14-18, 2016, Reno, Nevada, URL: https://www.3gpp.org/ftp/tsg_sa/WG2_Arch/TSGS2_118_Reno/Docs/S2-166455.zip.

* cited by examiner

SESSION MANAGEMENT METHOD AND APPARATUS

This application is a US National Stage of International Application No. PCT/CN2018/090027, filed on Jun. 6, 2018, which claims the priority to Chinese Patent Application No. 201710418244.5, filed with the Chinese Patent Office on Jun. 6, 2017 and Chinese Patent Application No. 201710677595.8, filed with the Chinese Patent Office on Aug. 9, 2017, both of which are hereby incorporated by reference in their entireties.

FIELD

The present invention relates to the field of communications, and particularly to a session management method and apparatus.

BACKGROUND

An Nx interface between a Mobility Management Entity (MME) and an Access Control and Mobility Management Function (AMF) in a fifth generation (5G) mobile network system is optionally supported, and when the Nx interface is supported in the mobile network, a handover between the 5G system and an Evolved Packet System (EPS) can be supported, and at this time, context information of user equipment including a mobility context and a session connection context shall be passed between the MME and the AMF. When the user equipment accesses the network supporting the Nx interface, the network may configure its registration mode as a single-registration mode which is an operating mode currently required to be supported by the user equipment.

When the Nx interface is not supported by the mobile network, a handover between the 5G system and a Long-Term Evolution (LTE) system is not supported, and at this time, in order to support interworking, the user equipment is required to be registered with the mobile network in a dual-registration mode, that is, it is registered with both the 5G system and the EPS. In order to support service continuity in the dual-registration mode, a Session Management Function (SMF) of a control-plane in the network shall also support the function of a Packet Data Network Gate Way-Control (PGW-C) so that a session connection of the user equipment moving between the EPS and the 5G system can be anchored on the same user-plane anchor all the time through handover registration.

Dually-registered user equipment is further categorized into Single-Radio (SR)-enabled and Dual-Radio (DR)-enabled user equipment. The SR user equipment can only maintain its session connection with one of the sides at a time, that is, it is can only maintain its session connection in either the EPS or the 5G system, so that if the UE moves between the EPS and the 5G system, then a packet will be lost inevitably, thus failing to guarantee seamless service continuity. The DR user equipment can be connected in both the EPS and the 5G system, so the connection of the DR user equipment moving between the different systems in the mobile network can be switched in a make-before-break manner, that is, the user equipment receives data from a source network while receiving data from a destination network so that a service access can be guaranteed.

Since the user equipment can negotiate with the network about the single-registration mode or dual-registration mode to be applied, there may be user equipment operating in different registration modes in the same network; and even if a uniform interworking mode is supported in the network, then the network may be really deployed so that the SMF with the PGW-C function can perform a control function of a gateway anchor, so it can serve both the network of the present operator, but also can serve a visited network of another operator in a roaming scenario, and the operator network and the visited network may support different interworking modes.

In order to serve user equipment operating in the single-registration mode, the SMF supporting the PGW-C function shall performing mapping between Quality of Service (QoS) parameters in different systems while establishing a session; and in order to serve user equipment operating in the dual-registration mode, the SMF supporting the PGW-C function will not perform mapping between QoS parameters in different systems.

Accordingly there is such a problem in the prior art that the SMF supporting the PGW-C function cannot identify the registration modes of the user equipment, and treat the user equipment differently, or the SMF cannot determine whether the AMF receiving a session request sent by the user equipment supports the interworking, so when the user equipment establishes a session connection in the mobile network, the SMF cannot determine whether to perform mapping between QoS parameters in different systems, and if the SMF performs mapping between QoS parameters in different systems by default, then there will be an unnecessary signaling procedure of the user equipment operating in the dual-registration mode.

SUMMARY

Embodiments of the invention provide a session management method and apparatus so as to address the problem in the prior art that the SMF supporting the PGW-C function cannot identify the registration modes of the user equipment, and treat the user equipment differently, or the SMF cannot determine whether the AMF to which a received session request sent by the user equipment relates support the interworking, so when the user equipment establishes a session connection in the mobile network, the SMF cannot determine whether to perform mapping between QoS parameters in different systems, and if the SMF performs mapping between QoS parameters in different systems by default, then there will be an unnecessary signaling procedure of the user equipment operating in the dual-registration mode.

In a first aspect, an embodiment of the invention provides a session management method, the method being applicable to a mobile network, and including:

determining a registration mode of user equipment sending a session establishment request, or determining whether a network-side device receiving the session establishment request sent by the user equipment supports interworking; and performing mapping between QoS parameters of different systems when establishing a session connection for the user equipment, in response to that the registration mode is a single-registration mode or the network-side device supports the interworking.

Optionally the determining the registration mode of the user equipment sending the session establishment request includes:

determining the registration mode of the user equipment as the single-registration mode or a dual-registration mode, according to registration mode information of the user equipment provided by an AMF; or determining the registration mode of the user equipment as the single-registration mode or the dual-registration mode, according to registration mode information carried in the received session establishment request sent by the user equipment.

Optionally the determining the registration mode of the user equipment as the single-registration mode or the dual-registration mode, according to the registration mode information of the user equipment provided by the AMF includes:

determining the registration mode of the user equipment according to the registration mode information of the user equipment provided by the AMF while the AMF forwards the session establishment request.

Optionally the method further includes:

determining the registration mode of the user equipment according to the received changed registration mode of the user equipment provided by the AMF if the registration mode of the user equipment is changed in a registration mode update procedure of the user equipment.

Optionally the determining whether the network-side device receiving the session establishment request sent by the user equipment supports the interworking includes:

determining whether the AMF supports the interworking, according to whether the AMF receiving the session establishment request supports an interworking interface.

Optionally the determining whether the network-side device receiving the session establishment request sent by the user equipment supports the interworking includes:

receiving an indicator from an AMF serving the user equipment, or an indicator from a SMF in a visited network serving the user equipment; and determining whether the AMF supports the interworking.

Optionally the indicator from the SMF in the visited network serving the user equipment includes:

an indicator carried by the SMF in the visited network in the session establishment request to indicate whether the AMF supports the interworking; or an indicator provided by the SMF in the visited network to indicate an EPS bearer identifier.

Optionally the performing mapping between the QoS parameters of the different systems when establishing the session connection for the user equipment, in response to that the network-side device supports the interworking includes:

performing mapping between QoS parameters of the different systems in response to that the AMF supports an interworking interface.

Optionally the performing mapping between QoS parameters of the different systems includes:

mapping a QoS parameter corresponding to the session connection to an EPS QoS parameter if the session connection is established in a 5G system; or mapping a QoS parameter corresponding to the session connection to a 5G system QoS parameter if the session connection is established in the EPS.

In a second aspect, an embodiment of the invention provides a session management apparatus, the apparatus being applicable to a mobile network, and including:

a first determining module configured to determine a registration mode of user equipment sending a session establishment request, or to determine whether a network-side device receiving the session establishment request sent by the user equipment supports interworking; and a second determining module configured to perform mapping between QoS parameters of different systems when establishing a session connection for the user equipment, in response to the registration mode is a single-registration mode or the network-side device supports the interworking.

Optionally the first determining module includes:

a first determining sub-module configured to determine the registration mode of the user equipment as the single-registration mode or a dual-registration mode, according to registration mode information of the user equipment provided by an AMF; or a second determining sub-module configured to determine the registration mode of the user equipment as the single-registration mode or the dual-registration mode, according to registration mode information carried in the received session establishment request sent by the user equipment.

Optionally the first determining sub-module is configured to:

determine the registration mode of the user equipment according to the registration mode information of the user equipment provided by the AMF while the AMF forwards the session establishment request.

Optionally the apparatus further includes:

a third determining module configured, if the registration mode of the user equipment is changed in a registration mode update procedure of the user equipment, to determine the registration mode of the user equipment according to the received changed registration mode of the user equipment provided by the AMF.

Optionally the first determining module is configured to:

determine whether the AMF supports the interworking, according to whether the AMF receiving the session establishment request supports an interworking interface.

Optionally the first determining module is configured to:

receive an indicator from an AMF serving the user equipment, or an indicator from a SMF in a visited network serving the user equipment; and determine whether the AMF supports the interworking.

Optionally the indicator from the SMF in the visited network serving the user equipment includes:

an indicator carried by the SMF in the visited network in the session establishment request to indicate whether the AMF supports the interworking; or an indicator provided by the SMF in the visited network to indicate an EPS bearer identifier.

Optionally the second performing module is configured to:

perform mapping between QoS parameters of the different systems in response to that the AMF supports an interworking interface.

Optionally the second performing module configured to perform mapping between QoS parameters of the different systems is configured to:

map a QoS parameter corresponding to the session connection to an EPS QoS parameter if the session connection is established in a 5G system; or map a QoS parameter corresponding to the session connection to a 5G system QoS parameter if the session connection is established in the EPS.

In a third aspect, an embodiment of the invention provides a computer device including a processor configured to execute computer program stored in a memory to perform the session management method according to any one of the embodiments in the first aspect.

In a fourth aspect, an embodiment of the invention provides a computer readable storage medium storing computer program configured, upon being executed, to perform the session management method according to any one of the embodiments in the first aspect.

In a fifth aspect, an embodiment of the invention provides a communication device including:

a processor configured to read and execute program in a memory to:

determine a registration mode of user equipment sending a session establishment request, or determine whether a network-side device receiving a session establishment request sent by user equipment supports interworking; and perform mapping between QoS parameters of different systems when establishing a session connection for the user equipment, in response to that the registration mode of the user equipment is a single-registration mode or the network-side device supports the interworking; and a transceiver configured to transmit and receive data under a control of the processor.

There are the following technical effects of the technical solutions according to the embodiments of the invention: the SMF supporting the PGW-C function can determine the registration mode of the user equipment, or whether the AMF supports the interworking, and determine whether to perform mapping between QoS parameters of the different systems in the mobile network, according to the registration mode or whether the AMF supports the interworking, so that the SMF can perform mapping between QoS parameters of different systems correctly for the session connection.

DETAILED DESCRIPTION OF THE EMBODIMENTS

In order to address the technical problem above, a technical solution to session management according to an embodiment of the invention generally includes: receiving a session establishment request; determining a registration mode of user equipment sending the session establishment request; and deciding whether to perform mapping between QoS parameters of different systems when establishing a session connection for the user equipment, according to the registration mode of the user equipment.

In order to better understand the technical solution above, the technical solution will be described below in details with reference to the drawings, and particular implementations thereof.

Figure 1:
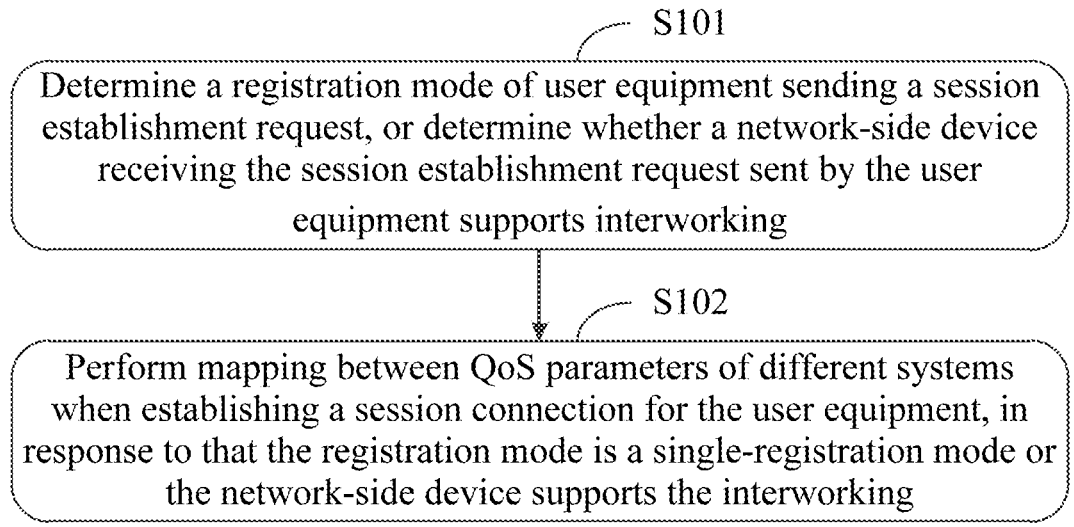
FIG. 1 is a network architecture model supporting interworking between the 5G system and the EPS in the prior art.

As illustrated in FIG. 1, a session management method according to a first embodiment of the invention, applicable to a mobile network, includes the following steps.

The step S101 is to determine a registration mode of user equipment sending a session establishment request, or to determine whether a network-side device receiving the session establishment request sent by the user equipment supports interworking.

The step S102 is to perform mapping between QoS parameters of different systems when establishing a session connection for the user equipment, in response to that the registration mode is a single-registration mode or the network-side device supports the interworking.

Particularly, the step S101 is as follow.

A SMF determines the registration mode of the user equipment as the single-registration mode or a dual-registration mode, according to registration mode information of the user equipment provided by an AMF. Particularly the SMF determines the registration mode of the user equipment according to the registration mode information of the user equipment provided by the AMF while the AMF forwards the session establishment request; or the SMF may determine the registration mode of the user equipment according to the registration mode information of the user equipment returned by the AMF while the AMF responds to a session management request of the SMF; or determine the registration mode of the user equipment as the single-registration mode or the dual-registration mode, according to registration mode information carried in the received session establishment request sent by the user equipment. Before the step S101, the method may further include the step of receiving the session establishment request.

Alternatively the SMF determines whether the AMF supports the interworking, according to whether the AMF receiving the session establishment request supports an interworking interface.

Alternatively an indicator from the AMF serving the user equipment, or an indicator from the SMF in a visited network serving the user equipment is received; and it is determined whether the AMF supports the interworking. The indicator from the SMF in the visited network serving the user equipment can include an indicator carried by the SMF in the visited network in the session establishment request to indicate whether the AMF supports the interworking, or an indicator provided by the SMF in the visited network to indicate an EPS bearer identifier.

Where the SMF supports a PGW-C function.

Moreover the registration mode of the user equipment determined in the step S101 may be updated while the user equipment is moving; and if the registration mode of the user equipment is changed, then the registration mode of the user equipment will be determined according to the changed registration mode of the user equipment provided by the AMF.

After the step S101 is performed, the step S102 is further performed particularly as follows.

When the registration mode of the user equipment is the single-registration mode, mapping is performed between QoS parameters of different systems. Particularly when the registration mode of the user equipment is the single-registration mode, mapping is performed between a 5G system QoS parameter and an EPS QoS parameter in the mobile network; or when the AMF supports the interworking interface, mapping is performed between QoS parameters of different systems.

If the session connection is established in the 5G system, then a QoS parameter corresponding to the session connection is mapped to an EPS QoS parameter; and if the session connection is established in the EPS, then a QoS parameter corresponding to the session connection is mapped to a 5G system QoS parameter.

Moreover when the registration mode of the user equipment is the dual-registration mode, no mapping is performed between QoS parameters of the different systems. Particularly when the registration mode of the user equipment is the dual-registration mode, no mapping is performed between a 5G system QoS parameter in the mobile network and an EPS QoS parameter in the mobile network.

In the technical solution according to this embodiment, when the registration mode of the user equipment is the single-registration mode, that is, the user equipment is only registered with the 5G system or the EPS, or the network-side device supports the interworking, mapping is performed between a 5G system QoS parameter and an EPS QoS parameter, so that the session connection of the user equipment is anchored on the same user-plane anchor all the time while the user equipment is moving between the EPS and the 5G system; and when the registration mode of the user equipment is the dual-registration mode, that is, the user equipment is registered with both the 5G system and the EPS, the session connection of the user equipment is anchored on the same user-plane anchor all the time, so no mapping is performed between a 5G system QoS parameter in the mobile network and an EPS QoS parameter in the mobile network. Accordingly the continuity of the session connection of the user equipment can be guaranteed while the user equipment is moving between the different systems in the mobile network.

Figure 2:
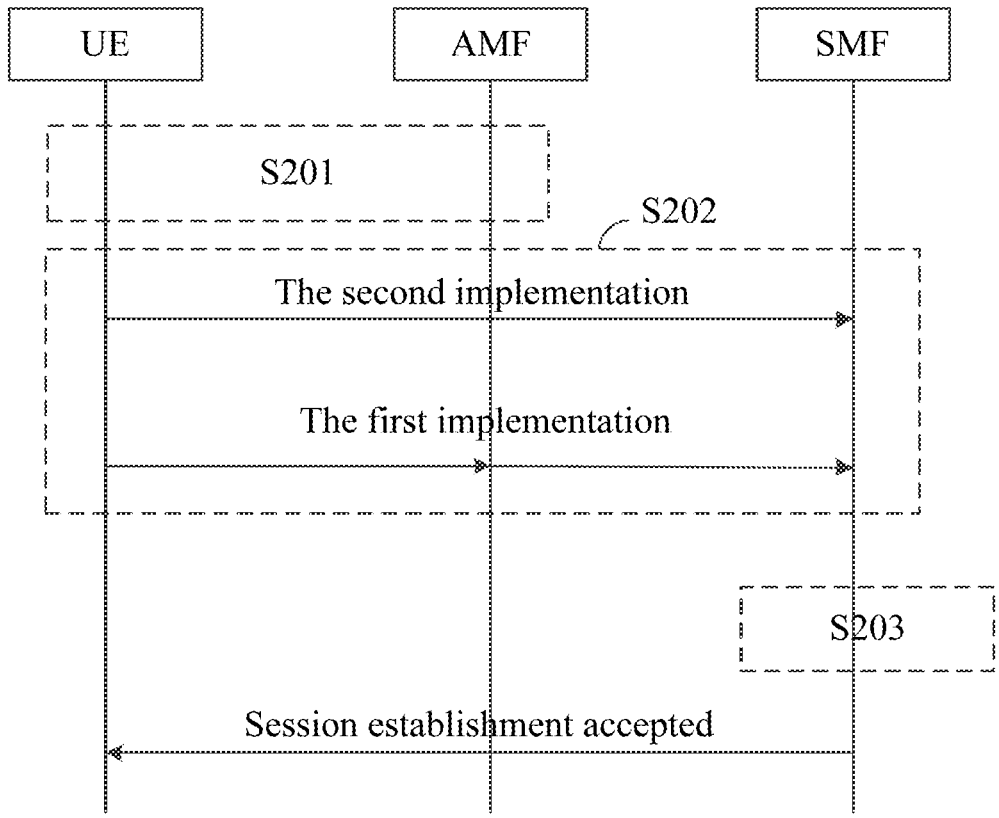
FIG. 2 is a first flow chart of a session management method according to embodiments of the invention.

In order to better understand the invention, the invention will be further described by way of an example, and FIG. 2 illustrates the session management method of user equipment while establishing the session, where the method includes the following steps.

In the step S201, the AMF negotiates with the user equipment for determining a registration mode of the user equipment.

In the step S202, the SMF receives a session establishment request initiated by the user equipment through the AMF, and upon reception of the session establishment request initiated by the user equipment, the SMF determines the registration mode of the user equipment sending the session establishment request, where the registration mode of the user equipment can be determined in the following two implementations.

There may be the following two implementations in which the registration mode of the user equipment is determined.

In a first implementation, the registration mode of the user equipment is determined according to registration mode information of the user equipment provided by the AMF.

Particularly the user equipment firstly sends the session establishment request, and when the AMF forwards the session establishment request to the SMF, the AMF indicates the registration mode information of the user equipment sending the session establishment request to the SMF; or the SMF may determine the registration mode information of the user equipment according to the registration mode of the user equipment returned by the AMF while the AMF responds to a session management request of the SMF.

In a second implementation, the registration mode of the user equipment is determined according to registration mode information provided by the user equipment.

Particularly when the SMF receives the session establishment request of the user equipment, the session establishment request sent by the user equipment carries the registration mode information of the user equipment.

In the step S203, the SMF determines whether to perform mapping between QoS parameters of different systems when establishing a session connection for the user equipment, according to the registration mode of the user equipment. This can be determined particularly as described in the step S102 above.

Figure 3:
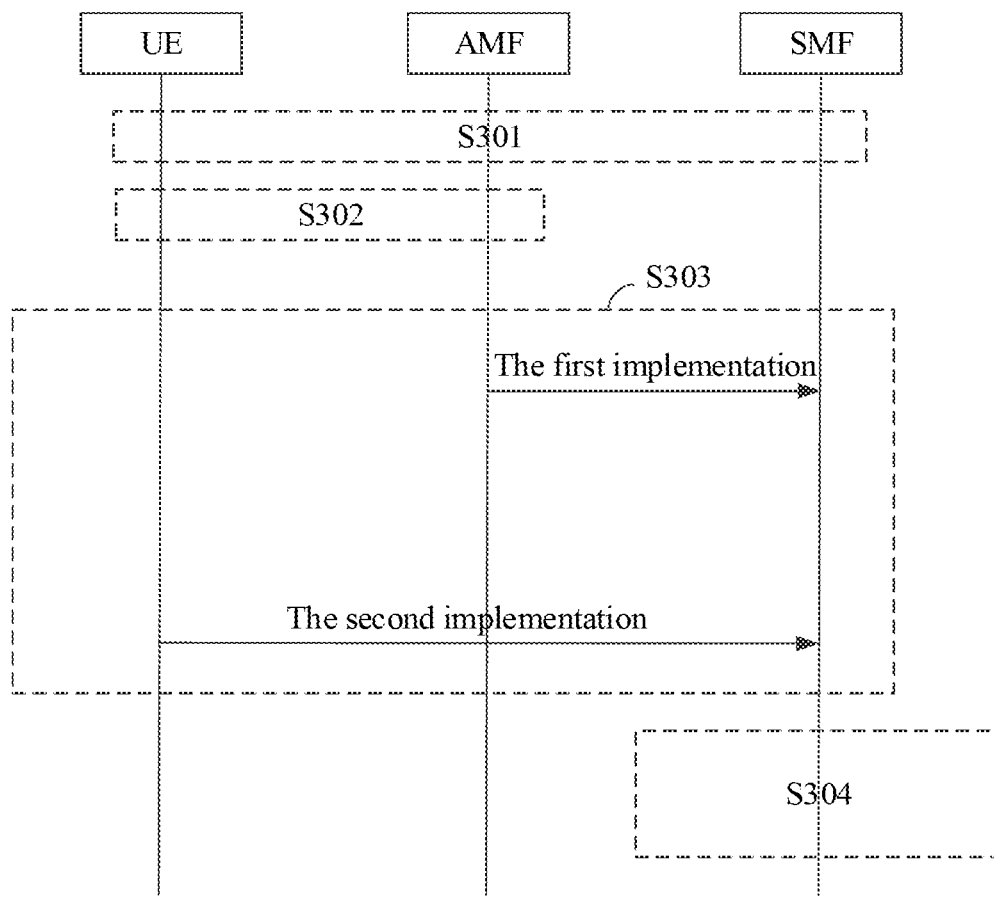
FIG. 3 is a second flow chart of a session management method according to the embodiments of the invention.

As illustrated in FIG. 3, the user equipment has established a session connection which can be switched between the 5G system and the EPS, and the session management method particularly includes the following steps.

The step S301 is to establish a session connection.

The step S302 is to perform by the user equipment a registration mode update procedure while the user equipment is moving.

The step S303 is to determine by the SMF the registration mode of the user equipment according to the changed registration mode of the user equipment provided by the AMF, when the registration mode of the user equipment is changed in the registration mode update procedure.

Particularly the registration mode of the user equipment can be determined as follows.

In a first implementation, the AMF determines the SMF supporting interworking according to the identifier (ID) of the SMF corresponding to the session connection in context information of the user equipment upon determining that the registration mode of the user equipment is changed; the AMF notifies the SMF supporting interworking of the changed registration mode; and the SMF determines the changed registration mode of the user equipment according to the changed registration mode notified by the AMF.

In a second implementation, the user equipment initiates a session modification procedure, and notifies the SMF that its registration mode is changed, upon determining that its registration mode is changed; and the SMF determines the changed registration mode of the user equipment. If the SMF supports interworking, then it will proceed to the step S304.

In the step S304, the SMF determines whether to perform mapping between QoS parameters of the different systems when establishing a session connection for the user equipment, according to the changed registration mode of the user equipment. This can be decided particularly as described in the step S102 above.

Figure 4:
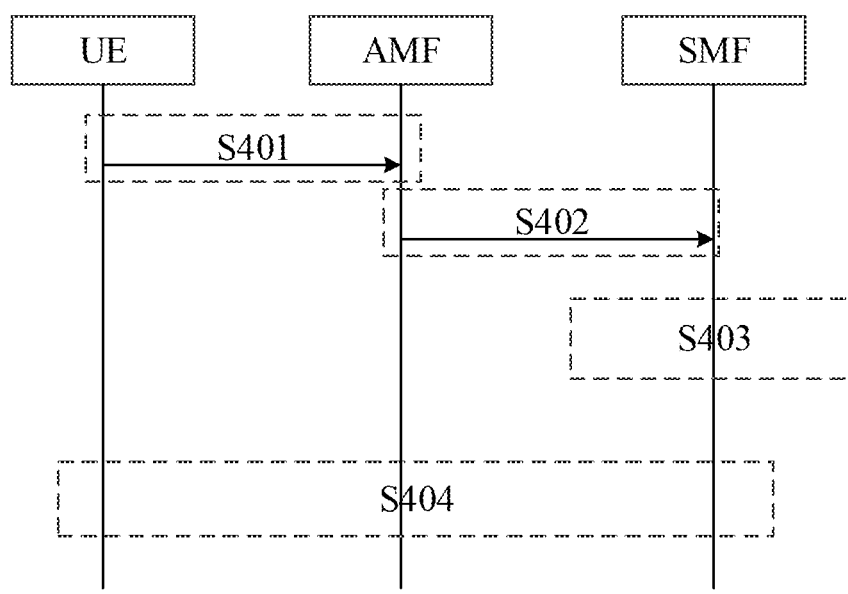
FIG. 4 is a third flow chart of a session management method according to the embodiments of the invention.

As illustrated in FIG. 4, a Packet Data Unit (PDU) session is managed particularly in the following steps in a PDU session establishment procedure.

In the step S401, the AMF receives a PDU session establishment request sent by the user equipment.

In the step S402, the AMF requests the SMF for establishing a PDU session, and indicates whether the AMF supports the interworking to the SMF in the session establishment request.

In the step S403, the SMF determines whether to perform mapping between QoS parameters of the different systems, according to whether the AMF supports the interworking, i.e., the N26 interface, as indicated by the AMF. When the AMF supports the interworking, mapping is performed between QoS parameters of the different systems.

In the step S404, the PDU session is established as in the prior art.

Figure 5A:
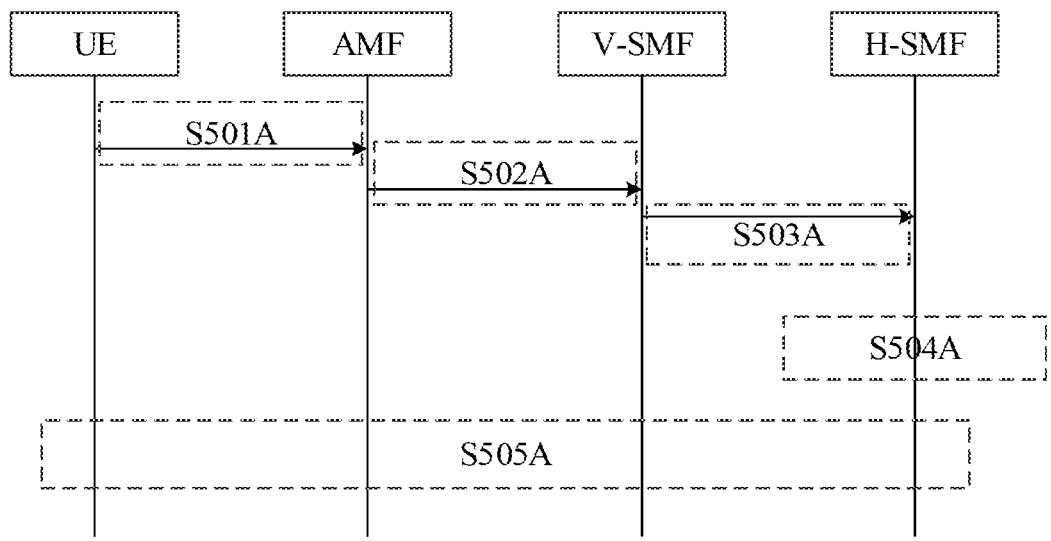
FIG. 5A is a fourth flow chart of a session management method according to the embodiments of the invention.

Alternatively as illustrated in FIG. 5A, a PDU session is managed particularly in the following steps in a PDU session establishment procedure.

In the step S501A, the UE initiates a PDU session establishment procedure in a Visited Public Land Mobile Network (VPLMN), and the AMF in the visited network receives a PDU session establishment request sent by the UE.

In the step S502A, if the AMF decides to establish a PDU session to a home SMF for the UE, that is, an anchor of the PDU session is located in a home network, then the AMF will select a Visited SMF (V-SMF) and a Home SMF (H-SMF) as in the prior art, and then send a session establishment request to the V-SMF, where the request can carry the interworking supported by the network, that is, indicate whether the AMF supports the N26 interface.

In the step S503A, after the V-SMF receives the request of the AMF, the V-SMF sends a session establishment request to the H-SMF, where the request carries an indicator indicating whether the AMF in the visited network supports the interworking, and the indicator can be received from the AMF, or can be configured statically on the V-SMF, e.g., an indicator carried in the session establishment request by the V-SMF to indicate whether the AMF supports the interworking, or an indicator provided by the V-SMF to indicate an EPS bearer identifier.

In the step S504A, after the H-SMF receives the session establishment request of the V-SMF, the H-SMF determines whether to perform mapping between QoS parameters of the different systems, according to whether the AMF supports the interworking, that is, whether the AMF supports the N26 interface. When the AMF supports the interworking, mapping is performed between QoS parameters of the different systems.

In the step S505A, the PDU session is established as in the prior art.

Figure 5B:
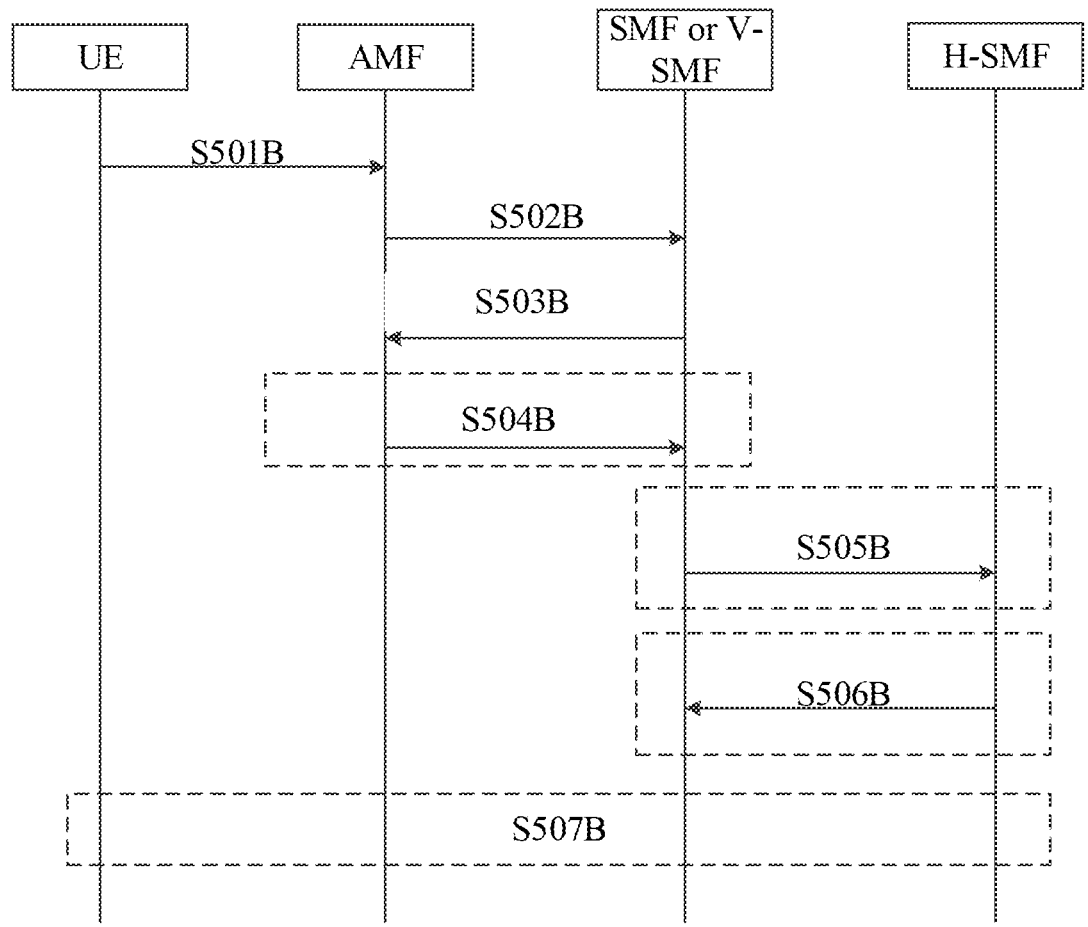
FIG. 5B is a fifth flow chart of a session management method according to the embodiments of the invention.

Alternatively as illustrated in FIG. 5B, a PDU session is managed particularly in the following steps in a PDU session establishment procedure.

In the step S501B, the UE initiates a PDU session establishment procedure.

In the step S502B, the AMF sends a PDU session request to the SMF upon reception of a PDU session request sent by the UE. If the UE is located in a visited network at this time, then the AMF sends the PDU session request to a V-SMF.

In the step S503B, after the SMF or the V-SMF receives the request, the SMF or the V-SMF sends a request to the AMF to request the AMF for allocating an EPS Bearer ID (EBI) for the session.

In the step S504B, the AMF determines whether to allocate an EBI for the PDU session, according to the interworking supported by the AMF, and if the AMF supports the N26 interface, then the AMF will allocate an EBI for the PDU session; otherwise, the AMF does not allocate any EBI. An allocation result is returned to the SMF or the V-SMF in a response.

In the step S505B, the SMF determines whether to map a QoS parameter to the EPS, according to the EBI allocation result, and if an EBI is allocated, then the SMF determines to map a QoS parameter; otherwise, the SMF determines not to map any QoS parameter. The V-SMF determines the interworking supported by the network, according to the EBI allocation result, and then sends the interworking supported by the network and/or the EBI to an H-SMF.

In the step S506B, if the H-SMF receives the EBI from the V-SMF, then it will map a QoS parameter to the EPS, and if the received interworking supported by the network indicates that N26 is not supported, then it will not map any QoS parameter to the EPS.

In the step S507B, the PDU session is established as in the prior art.

Figure 6:
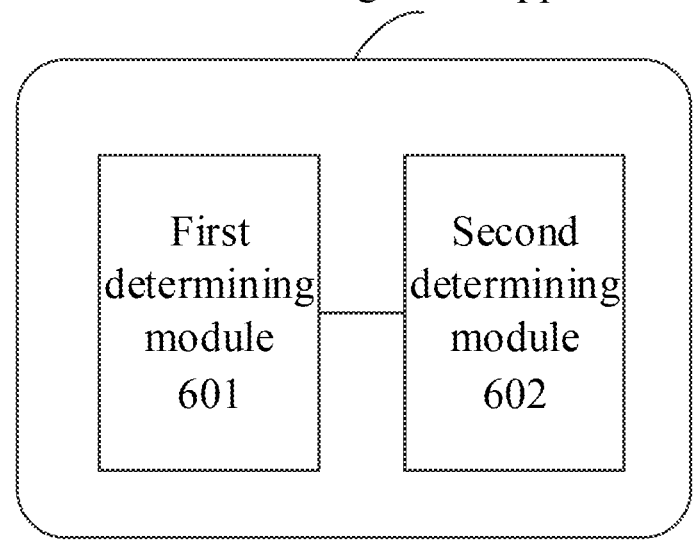
FIG. 6 is a first schematic diagram of a session management apparatus according to the embodiments of the invention.

As illustrated in FIG. 6, a session management apparatus according to a second embodiment of the invention, applicable to a mobile network, includes:

a first determining module 601 is configured to determine a registration mode of user equipment sending a session establishment request, or to determine whether a network-side device receiving the session establishment request sent by the user equipment supports interworking; and a second determining module 602 is configured to perform mapping between QoS parameters of different systems when establishing a session connection for the user equipment, in response to that the registration mode is a single-registration mode or the network-side device supports the interworking.

The first determining module 601 includes a first determining sub-module or a second determining sub-module.

The first determining sub-module is configured to determine the registration mode of the user equipment as the single-registration mode or a dual-registration mode, according to registration mode information of the user equipment provided by an AMF. Particularly the first determining sub-module is configured to determine the registration mode of the user equipment according to the registration mode information of the user equipment provided by the AMF while the AMF forwards the session establishment request; or the first determining sub-module is configured to determine the registration mode of the user equipment according to the registration mode information of the user equipment returned by the AMF while the AMF responds to a session management request of the SMF; or the second determining sub-module is configured to determine the registration mode of the user equipment as the single-registration mode or the dual-registration mode, according to registration mode information carried in the received session establishment request sent by the user equipment. The apparatus may further include a receiving module configured to receive the session establishment request.

Alternatively the first determining module 601 is configured to determine whether the AMF supports the interworking, according to whether the AMF receiving the session establishment request supports an interworking interface.

Alternatively the first determining module 601 is configured to: receive an indicator from an AMF serving the user equipment, or an indicator from an SMF in a visited network serving the user equipment, and determine whether the AMF supports the interworking, where the indicator from the SMF in the visited network serving the user equipment includes an indicator carried by the SMF in the visited network in the session establishment request to indicate whether the AMF supports the interworking, or an indicator provided by the SMF in the visited network to indicate an EPS bearer identifier.

Where the SMF supports a PGW-C function.

Moreover the session management apparatus further includes a third determining module, where the registration mode of the user equipment may be updated while the user equipment is moving; and the third determining module is configured, if the registration mode of the user equipment is changed, to determine the registration mode of the user equipment according to the received changed registration mode of the user equipment provided by the AMF.

The second determining module 602 is further configured, when the registration mode of the user equipment is the single-registration mode, to perform mapping between QoS parameters of the different systems, and particularly when the registration mode of the user equipment is the single-registration mode to perform mapping between a 5G system QoS parameter and an EPS QoS parameter in the mobile network, or when the AMF supports an interworking interface, to perform mapping between QoS parameters of the different systems.

The second determining module is configured to map a QoS parameter corresponding to the session connection to an EPS QoS parameter if the session connection is established in a 5G system, and map a QoS parameter corresponding to the session connection to a 5G system QoS parameter if the session connection is established in the EPS.

Moreover when the registration mode of the user equipment is the dual-registration mode, no mapping is performed between QoS parameters of the different systems. Particularly when the registration mode of the user equipment is the dual-registration mode, no mapping is performed between a 5G system QoS parameter in the mobile network and an EPS QoS parameter in the mobile network.

In this embodiment, the operating principle of the session management apparatus is the same as the session management method above, so a repeated description thereof will be omitted here.

In the technical solution according to this embodiment, when the registration mode of the user equipment is the single-registration mode, that is, the user equipment is only registered with the 5G system or the EPS, or the network-side device supports the interworking, mapping is performed between a 5G system QoS parameter and an EPS QoS parameter, so that the session connection of the user equipment is anchored on the same user-plane anchor all the time while the user equipment is moving between the EPS and the 5G system; and when the registration mode of the user equipment is the dual-registration mode, that is, the user equipment is registered with both the 5G system and the EPS, the session connection of the user equipment is anchored on the same user-plane anchor all the time, so no mapping is performed between a 5G system QoS parameter in the mobile network and an EPS QoS parameter in the mobile network. Accordingly the continuity of the session connection of the user equipment can be guaranteed while the user equipment is moving between the different systems in the mobile network.

A third embodiment of the invention provides a computer device including a processor configured to execute computer program stored in a memory to perform the session management method according to the embodiment above.

A fourth embodiment of the invention provides a computer readable storage medium storing computer program configured, upon being executed, to perform the session management method according to the embodiment above.

A fifth embodiment of the invention provides a communication device including:

a processor configured to read and execute program in a memory to:

determine a registration mode of user equipment sending a session establishment request, or determine whether a network-side device receiving a session establishment request sent by user equipment supports interworking; and perform mapping between QoS parameters of different systems when establishing a session connection for the user equipment, in response to that the registration mode of the user equipment is a single-registration mode or the network-side device supports the interworking; and a transceiver configured to transmit and receive data under a control of the processor.

Reference can be made to the implementations of the session management method and apparatus for a particular implementation of the communication device.

There are at least the following technical effects or advantages of the technical solutions according to the embodiments above of the invention: the SMF supporting the PGW-C function can determine the registration mode of the user equipment, or whether the AMF supports the interworking, and decide whether to perform mapping between QoS parameters of the different systems in the mobile network, according to the registration mode or whether the AMF supports the interworking, so that the SMF can map a QoS parameter correctly for the session connection.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A session management method, the method comprising:

determining whether a network-side device receiving a session establishment request sent by a user equipment supports interworking; and performing mapping between Quality of Service (QoS) parameters of different systems when establishing a session connection for the user equipment, in response to that the network-side device supports the interworking;

wherein the determining whether the network-side device receiving the session establishment request sent by the user equipment supports the interworking comprises:

receiving an indicator from a Session Management Function (SMF) in a visited network serving the user equipment; and determining whether an Access Control and Mobility Management Function (AMF) supports the interworking;

wherein the indicator from the SMF in the visited network serving the user equipment comprises:

an indicator carried by the SMF in the visited network in the session establishment request to indicate whether the AMF supports interworking; or an indicator provided by the SMF in the visited network to indicate an Evolved Packet System (EPS) bearer identifier.

2. The method according to claim 1, wherein the determining whether the network-side device receiving the session establishment request sent by the user equipment supports the interworking comprises:

determining whether the AMF supports the interworking, according to whether the AMF receiving the session establishment request supports an interworking interface.

3. The method according to claim 1, wherein the performing mapping between the QoS parameters of the different systems when establishing the session connection for the user equipment, in response to that the network-side device supports the interworking comprises:

performing mapping between QoS parameters of the different systems in response to that the AMF supports an interworking interface.

4. The method according to claim 1, wherein the session connection is established in a 5th-Generation (5G) system, and the performing mapping between QoS parameters of the different systems comprises:

mapping a QoS parameter corresponding to the session connection to an EPS QoS parameter; or wherein the session connection is established in the EPS system, and the performing mapping between QoS parameters of the different systems comprises:

mapping a QoS parameter corresponding to the session connection to a 5G system QoS parameter.

5. The method according to claim 2, wherein the performing mapping between the QoS parameters of the different systems when establishing the session connection for the user equipment, in response to that the network-side device supports the interworking comprises:

performing mapping between QoS parameters of the different systems in response to that the AMF supports an interworking interface.

6. The method according to claim 1, wherein the performing mapping between the QoS parameters of the different systems when establishing the session connection for the user equipment, in response to that the network-side device supports the interworking comprises:

performing mapping between QoS parameters of the different systems in response to that the AMF supports an interworking interface.

7. A session management apparatus, the apparatus being applicable to a mobile network, and comprising:

a processor configured to read and execute program in a memory to:

determine whether a network-side device receiving a session establishment request sent by a user equipment supports interworking; and perform mapping between Quality of Service (QoS) parameters of different systems when establishing a session connection for the user equipment, in response to the network-side device supports the interworking;

a transceiver, configured to transmit and receive data under a control of the processor;

wherein the processor is further configured to read and execute the program to:

receive an indicator from a Session Management Function (SMF) in a visited network serving the user equipment; and determine whether an Access Control and Mobility Management Function (AMF) supports the interworking;

wherein the indicator from the SMF in the visited network serving the user equipment comprises:

an indicator carried by the SMF in the visited network in the session establishment request to indicate whether the AMF supports the interworking; or an indicator provided by the SMF in the visited network to indicate an Evolved Packet System (EPS) bearer identifier.

8. The apparatus according to claim 7, wherein the processor is further configured to read and execute the program to:

determine whether the AMF supports the interworking, according to whether the AMF receiving the session establishment request supports an interworking interface.

9. The apparatus according to claim 7, wherein the processor is further configured to read and execute the program to:

perform mapping between QoS parameters of the different systems in response to that the AMF supports an interworking interface.

10. The apparatus according to claim 7, wherein the session connection is established in a 5th-Generation (5G) system, and the processor is further configured to read and execute the program to: map a QoS parameter corresponding to the session connection to an EPS QoS parameter; or wherein the session connection is established in the EPS system, and the processor is further configured to read and execute the program to: map a QoS parameter corresponding to the session connection to a 5G system QoS parameter.

11. The apparatus according to claim 8, wherein the processor is further configured to read and execute the program to:

perform mapping between QoS parameters of the different systems in response to that the AMF supports an interworking interface.

12. A non-transitory computer readable storage medium storing computer program configured, upon being executed by a processor, to perform the method according to claim 1.

* * * * *